United States Patent [19]
Theodos et al.

[11] Patent Number: 5,725,015
[45] Date of Patent: Mar. 10, 1998

[54] PILOT-OPERATED SAFETY RELIEF VALVE ASSEMBLY

[75] Inventors: Michael Andrew Theodos, Alexandria; Roger Dale Danzy, Pineville, both of La.

[73] Assignee: Dresser Industries, Inc., Dallas, Tex.

[21] Appl. No.: 642,024

[22] Filed: Apr. 29, 1996

[51] Int. Cl.6 .................................. F16K 31/124
[52] U.S. Cl. ............................ 137/488; 137/492.5
[58] Field of Search ............................ 137/489, 492, 137/492.5, 487.5, 488

[56] References Cited

U.S. PATENT DOCUMENTS

| | | |
|---|---|---|
| 1,769,612 | 7/1930 | Wettstein ................ 137/492.5 X |
| 3,456,674 | 7/1969 | Buresh et al. . |
| 3,664,362 | 5/1972 | Weise . |
| 3,709,258 | 1/1973 | Weise . |
| 3,722,852 | 3/1973 | Powell et al. . |
| 3,848,630 | 11/1974 | Weise . |
| 4,240,463 | 12/1980 | Moore . |
| 4,338,856 | 7/1982 | Smilges et al. . |
| 4,445,531 | 5/1984 | Powell . |
| 4,458,716 | 7/1984 | Danré . |
| 4,548,231 | 10/1985 | Schwede . |
| 4,722,361 | 2/1988 | Reip . |
| 4,791,955 | 12/1988 | Reip . |
| 4,881,571 | 11/1989 | Reip . |
| 4,917,144 | 4/1990 | Giles . |
| 4,958,656 | 9/1990 | Patel . |
| 4,972,870 | 11/1990 | Changnian et al. ............. 137/488 X |
| 5,234,023 | 8/1993 | Lai . |
| 5,396,923 | 3/1995 | Allen et al. ................... 137/487.5 |

Primary Examiner—Stephen M. Hepperle
Attorney, Agent, or Firm—Haynes and Boone L.L.P.

[57] ABSTRACT

An assembly and method for controlling the opening of a safety relief valve exposed to a system fluid pressure and containing a control fluid which controls the opening of the safety relief valve. The assembly includes a pilot valve connected to the safety relief valve and adapted to respond to a predetermined pressure of the system fluid for permitting flow of the control fluid. A regulator receives the control fluid and operates to reduce the pressure of the control fluid a predetermined amount. The safety relief valve opens in response to the reduction of the control fluid pressure, and the remaining control fluid pressure modulates the opening of the safety relief valve.

22 Claims, 3 Drawing Sheets

PILOT-OPERATED SAFETY RELIEF VALVE ASSEMBLY

FIELD OF THE INVENTION

This invention pertains to a safety relief valve assembly and method and, more particularly, to such an assembly and method in which a pilot valve operates a safety relief valve, and a regulator is provided which cooperates with the pilot valve for modulating the degree of opening of the safety relief valve.

CROSS-REFERENCE TO RELATED APPLICATIONS

This application is based on provisional application Ser. No. 60/013,548, filed Mar. 14, 1996.

BACKGROUND OF THE INVENTION

Pressurized vessels and conduits are commonly fitted with pressure relief valves to prevent the pressure of fluid inside the vessels and conduits from exceeding a prescribed limit beyond which the vessel, conduit, or equipment connected thereto, could rupture or be damaged.

A typical pressure relief valve has an inlet in fluid communication with the main fluid line and an outlet connected to an exhaust line. A piston, or valve mechanism, is provided which is normally maintained in a closed position by a compressed spring. The compression of the spring is adjusted to keep the piston in its closed position until the fluid on the inlet side attains a predetermined pressure. When this occurs, the piston moves to an open position, fluid flows into the inlet, through the valve housing, and out through the outlet, thereby relieving the pressure. Once the pressure is reduced to a point below the predetermined pressure, the spring moves the piston back to its closed position, and normal fluid flow through the line resumes.

Safety relief valves of this type must maintain a sealed closure of the vessel or conduit under normal service conditions, and must achieve minimal "blowdown", i.e. the difference between the opening pressure and the closing pressure. To accomplish this, and to achieve increased performance in other respects, safety relief valve assemblies have evolved which are controlled by a piloting device which senses the pressure of the fluid in the vessel or conduit and actuates the valve as a function of this pressure almost instantaneously to achieve rapid and complete openings and closures with relatively small blowdown.

Present day pilot-operated safety relief valves are generally of the "pop" type which includes a pilot relief valve which opens at a predetermined pressure, thus causing the safety relief valve to open. In a typical arrangement of this type, the dome pressure (i.e., the pressure which holds the main valve closed) is reduced to atmospheric pressure, and the piston thus moves to a full open position, almost instantaneously. However, this causes several problems. For example, extremely large quantities of fluid are discharged from the safety relief valve in response to the quick opening of the piston. Also, the extremely quick opening and closing of the piston causes an inordinate amount of wear and stress on the piston and its associated components as well as the associated flow conduits. Further, under certain resonant conditions, the piston will "chatter", that is, open and close at a very rapid rate which renders it dysfunctional and subject to premature failure. Still further, these type of pressure relief valves and associated pilot valves are relatively complicated and expensive.

Therefore, what is needed is a pilot-operated safety relief valve in which the amount of fluid discharge from the valve is modulated, and wear and stress on the valve components and the associated flow conduits are minimized. Also needed is a valve of the above type that does not chatter and is relatively inexpensive and simple in construction and operation.

SUMMARY OF THE INVENTION

The present invention, accordingly, provides an assembly and method in which a pilot valve is provided which controls the operation of the safety relief valve, and a regulator modulates the operation of the pilot valve, and therefore the opening and closing of the safety relief valve. To this end, an operating fluid is provided in a chamber which provides a pressure that normally biases the piston of the safety relief valve to a closed position. The pilot valve is connected to the safety relief valve in a manner to vent the operating fluid from the chamber and thus enable the piston to open. The regulator is connected to the pilot valve in a manner to control the discharge of the operating fluid so that the safety relief valve gradually opens.

Thus, major advantages are achieved with the assembly method of the present invention since the amount of fluid discharged from the safety relief valve is reduced, and wear and stress on the valve components and the associated flow conduits are minimized. Also, the safety relief valve does not chatter and is relatively inexpensive and simple in construction and operation.

DESCRIPTION OF THE PREFERRED EMBODIMENT

Figure 1:
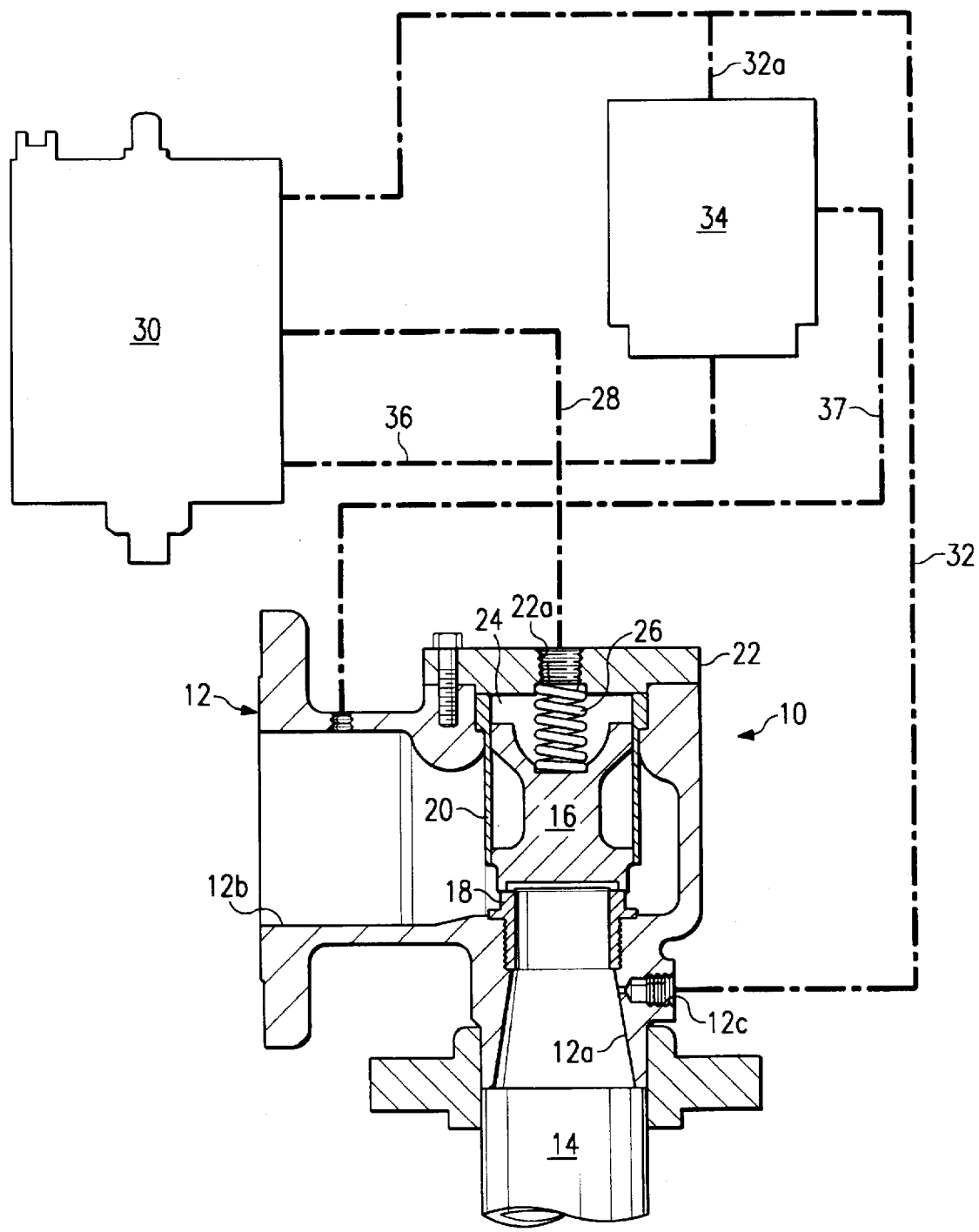
FIG. 1 is a partial sectional-partial schematic view of the safety relief valve assembly of the present invention.

Referring to FIG. 1 of the drawings, the reference numeral 10 refers, in general to a safety relief valve including a housing 12 having an inlet passage 12a formed through one wall thereof for receiving a conduit 14 containing a fluid under pressure. An outlet passage 12b is also provided in the housing 12 which extends at fight angles to the inlet passage 12a for exhausting the fluid under conditions to be described.

A movable piston 16 is provided in the housing and, in its closed position, rests against a seat bushing 18 disposed in the housing 12 in alignment with the inlet passage 12a. The piston 16 moves up and down in the housing 12 as viewed in FIG. 1, and a cylindrical guide member 20 is disposed in the housing above the bushing 16 for guiding this movement. A cover 22 extends over the upper portion of the housing 12 to define a chamber 24 between the upper portion of the piston 16 and the cover. A control fluid is contained in the chamber 24 for biasing the piston 16 to its closed position resting against the seat bushing 18, as shown in FIG. 1. In this context, the upper end portion of the valve 16 is curved to define a larger surface area than that of the lower end of the valve. Since the pressure of the control fluid in the chamber 24 is essentially the same as the pressure of the system fluid in the inlet passage 12a, as will be explained further, the force exerted on the upper portion of the piston 16 by the control fluid is greater than the force exerted on the lower end of the piston by the system fluid due to the differences in these areas. A spring 26 is also disposed in the chamber 24 which adds to the downwardly-directed forces acting on the upper end portion of the piston 16.

A port 22a is provided through the cover 22 and communicates with the chamber 24. The port 22a is connected, via a conduit 28, to a pilot valve 30, shown schematically in FIG. 1, for controlling the fluid pressure in the chamber 24 in a manner to be described. A port 12c is provided through a wall of the housing 12 in communication with the inlet passage 12a, and is connected, via a conduit 32, to the pilot valve 30. A branch conduit 32a also connects the conduit 32, and therefore the port 12a, to a regulator 34, also shown schematically. The regulator 34 regulates the operation of the pilot valve 30 in a manner to be described, and to this end, a conduit 36 connects an outlet of the pilot valve 30 to an inlet of the regulator 34, and a conduit 37 connects the outlet of the regulator to the outlet passage 12b of the safety relief valve 10. These various connections between the safety relief valve 10, the pilot valve 30, and the regulator 34 will be described in detail.

As stated above, the forces caused by the pressure of the control fluid and the spring 26 in the chamber 24 acting against the upper end of the piston 16 normally bias the latter member to its closed position shown in FIG. 1. However, when the pressure of the control fluid in the chamber 24 is relieved by the valve assembly of the present invention, the piston 16 is forced upwardly away from the seat bushing 18 and the pressurized fluid in the inlet passage 12a is relieved and some of the fluid flows through the inlet passage 12a, the housing 12 and exits the housing through the outlet passage 12b. Since the safety relief valve 10, per se, does not form a part of the present invention, the more specific details of same, including the provision of seals, and the like, associated with the valve have been omitted. In the latter context, a full, detailed disclosure and description of the safety relief valve 10 is contained in U.S. Pat. No. 4,917,144, assigned to the assignee of the present invention, the disclosure of which is incorporated by reference.

Figure 2:
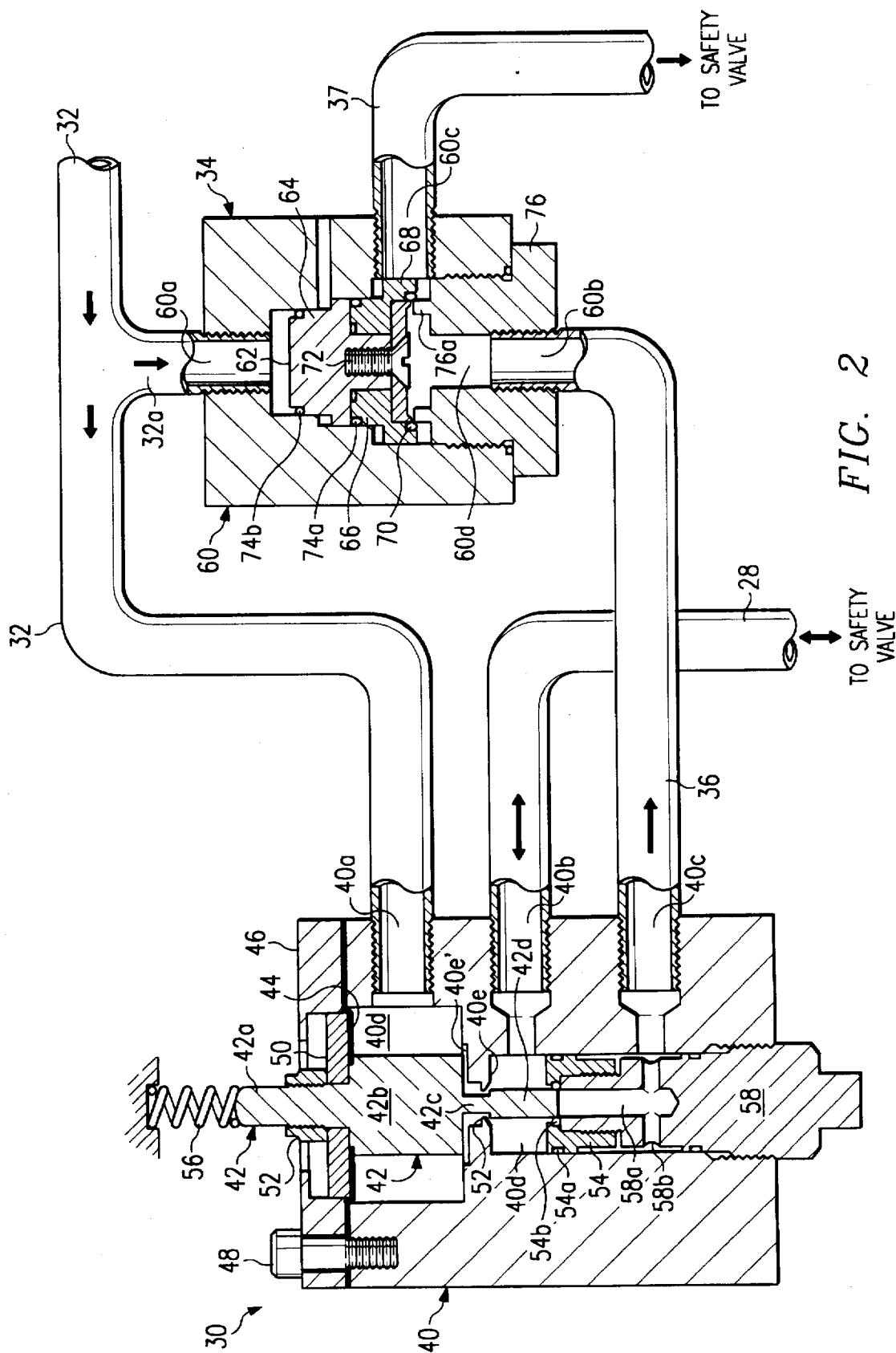
FIG. 2 is an enlarged sectional view of the pilot valve and the regulator of FIG. 1, showing the pilot valve and the regulator their closed positions.

FIG. 2 depicts the details of the pilot valve 30 and the regulator 34. The pilot valve 30 includes a housing 40 having an inlet passage 40a connected to the conduit 32 for receiving the system fluid from the safety relief valve 10 (FIG. 1). A passage 40b is also provided in the housing 40 which is connected to the conduit 28 extending from the chamber 24 (FIG. 1) of the safety relief valve 10, and an outlet passage 40c is connected to the conduit 36 extending to the regulator 34.

A centrally-located bore 40d extends though the length of the housing 40 and communicates the passages 40a–40c. The upper portion of the bore 40d is enlarged and receives a piston 42. Reciprocal movement of the piston 42 in the housing 40 is permitted by an annular diaphragm 44 extending across the enlarged portion of the bore 40d and secured between the upper end of the housing 40 and a cover 46 extending over the latter end. The cover 46 is secured to the housing 40 by a threaded bolt 48 extending through corresponding threaded openings in the cover and the housing.

The piston 42 has a stepped outer diameter defining four portions with varying diameters including an upper stem 42a having a reduced diameter. The stem 42a extends through aligned central openings in the diaphragm 44 and a center plate 50 extending over the exposed portion of the diaphragm 44. An intermediate portion 42b of the piston 42 extends immediately below the diaphragm 44 and a nut 52 is in threaded engagement with the stem 42a to secure the center plate 50 and the diaphragm 44 between it and the shoulder defined between the stem 42a and the piston portion 42b.

The piston portion 42b extends into the bore 40d, a necked-down portion 40c of the piston 42 extends immediately below the portion 42b, and a control stem 42d extends below the necked down portion. When the piston 42 is in its closed position shown in FIG. 2, the lower end of the piston portion 42b abuts an internal flange 40e extending inwardly from the bore 40d. The flange 40e has a seal ring 52 mounted to its inner surface which, in the closed position of the piston 42, surrounds the necked-down piston portion 42c with a clearance therebetween. An annular groove 40e' is formed in the upper surface of the flange 40e to provide for fluid communication from the passage 40a, through the groove 40e' and the bore 40d, and including the space between the flange 40e and the necked-down piston portion 42c, and to the passage 40b. This equalizes the fluid pressure in the passage 40b, and therefore the chamber 24 of the pressure relief valve 10 to that of the system pressure in the chamber 40a, for reasons to be described.

A sleeve 54 is mounted in the bore 40d of the housing 40 and extends below the flange 40e in a spaced relationship thereto. The sleeve 54 is sized so as to fit snugly within the bore 40d, and a seal ring 54a extends between the outer surface of the sleeve 54 and the corresponding surface of the housing 40 defining the bore 40d. A seal ring 54b is mounted on the inner surface of the sleeve 54 and, in the closed position of the piston 42 shown in FIG. 2, engages the outer surface of the lower end portion of the stem 42d to block flow communication between the passages 40b and 40c through the bore 40d.

A spring 56 is applied to the upper stem 42a of the piston 42 to urge the piston downwardly as viewed in FIG. 2. Since the spring 56 is of a conventional design, it is not shown in detail and its associated components are not shown, in the interest of clarity. The downwardly-directed force exerted by the spring on the piston 42 is opposed by an upwardly-directed force exerted against the diaphragm 44, and therefore the piston 42, by the pressure of the system fluid from the conduit 32 that enters the inlet passage 40a of the housing 40. The design is such that, if the pressure of the system fluid stays within normal limits, the force of the spring 56 acting on the piston 42 will exceed the upwardly-directed force applied by the fluid pressure acting on the diaphragm 44, and maintain the piston 42 in its closed position of FIG. 2. However, if the force of the system fluid acting against the lower end of the diaphragm 44 is greater than the force of the spring 56 acting against the piston 42, the central portion of the diaphragm, and therefore the piston 42, will move upwardly. This causes the stem 42d of the piston 42 to clear, or rise, above the seal ring 54b and attain the position shown in FIG. 3. This communicates the passage 40b and 40c through the bore 40d and thus permits the control fluid from the chamber 24 (FIG. 1) of the safety relief valve 10 to flow through the conduit 28, the housing bore 40d, and to the outlet conduit 40c for passage to the regulator 34. Also, in the open position of the piston 42 shown in FIG. 3, the upper portion of the stem 42d of the piston 42 engages the seal ring 52 to prevent fluid communication between the passages 40a and 40b. The significance of this will be described later.

A blowdown adjustment plug 58 is mounted in the lower portion of the bore 40d. The upper end portion of the plug 58 has a reduced diameter and nestles within the sleeve 54 in threaded engagement therewith. The plug 58 has a central passage 58a connected to the passage 40b and a radial passage 58b connected to the central passage to permit the above-mentioned flow from the passage 40b, through the bore 40d and to the passage 40c. The lower end portion of the plug 58 and the corresponding internal surface of the housing defining the bore 40d are threaded and in engagement so that the axial position of the plug, and therefore the sleeve 54, can be adjusted relative to the housing 40 by rotating the plug. A seal ring 54a extends between the corresponding surfaces of the plug 58 and the latter housing surface to prevent fluid leakage therebetween. This axial rotation of the plug 58 sets the position of the sleeve 54 relative to the 42d of the piston 42, and thus enables the blowdown of the assembly to be adjusted, as will be discussed.

The regulator 34 consists of a housing 60 having an inlet passage 60a which is connected to a branch conduit 32a extending from the conduit 32 and therefore receives the system fluid from the safety relief valve 10 (FIG. 1). A second inlet passage 60b and an outlet, or vent passage 60c are provided in the housing 60, and a central bore 60d is provided through the housing that connects the passages 60a, 60b, and 60c.

A valve assembly 62 is disposed in the bore 60d of the housing 60 and includes a piston 64 and a sleeve 66 extending below the piston and in engagement therewith. A center plate 68 is provided in a counterbore provided in the sleeve 66 and engages a seal ring 70 provided in a groove formed in the inner surface of the seal ring defining the counterbore. A bolt 72 extends through threaded, aligned, central openings formed through the piston 64 and the sleeve 66 and through the center opening in the center plate 68, to connect the center plate 68 and the sleeve 66 to the piston 64. Two seal rings 74a and 74b are respectively located in two axially spaced grooves formed in the outer surface of the sleeve 66 and engages the corresponding surface of the housing defining the bore 60d.

The lower end portion of the bore 60d is enlarged and the inner wall portion of the housing 60 defining this lower end portion is threaded. A plug 76 is mounted in the lower end portion of the bore 60d and has a bore that defines the inlet passage 60b. The plug 76 has an externally threaded outer surface portion in threaded engagement with the threaded inner wall portion of the housing 60. An annular, upwardly-extending flange 76a extends from the upper end of the plug 76 and, in the closed position of the valve assembly shown in FIG. 2, the outer surface of the flange 76 engage the seal ring 70 of the valve assembly 62.

The pressure of the system fluid from the branch conduit 32a thus acts on the upper end of the valve assembly 62 to urge it to its closed position in which the seal ring 70 engages the flange 76a of the plug 76. However, when fluid is passed from the outlet passage 40c of the housing 40 to the conduit 36 under conditions to be described, the pressure of the fluid in the conduit 36 acts against the lower end of the valve assembly 62. The area of the lower surface of the valve assembly 62 is greater that the area of its upper surface, and since the respective pressures of the control fluid and the system are the same for the reasons discussed above, the control fluid pressure acting on the lower end of the valve assembly 62 creates a force that is greater than the force caused by the system pressure acting on the upper end of the valve assembly. As a result, the valve assembly 62 will move upwardly in the bore 60d to its open position and thus permit the fluid in the conduit 36 to pass from the passage 60b, through a portion of the bore 60d and to the outlet passage 60c. The fluid then exits the regulator 34 and passes through the conduit 37 to the outlet passage 12b of the safety relief valve 10 (FIG. 1). It is noted that the upward movement of the valve assembly 62 is limited by the engagement of corresponding shoulders formed on the sleeve 66 and the housing 60 as shown in FIG. 3.

In operation, when the system fluid pressure is within a predetermined limit, the pistons 16 and 42 of the safety relief valve 10 and the pilot valve 30, respectively, as well as the valve assembly 62 of the regulator 34, stay in their normal, closed position shown in FIG. 2. As a result, the pressure of the control fluid in the conduit 28 is equalized to the pressure of the system fluid in the conduit 32 through the pilot valve housing 30 and, more particularly, through the inlet passage 40a, the groove 40e', the space between the necked-down piston portion 40c and the seal ring 52, the bore 40d, and the passage 40b. Also, the flow of the system fluid through the safety relief valve 10, and the flow of the control fluid from the chamber 24 of the safety relief valve 10 through the conduit 28 and to the pilot valve 30, are prevented.

Figure 3:
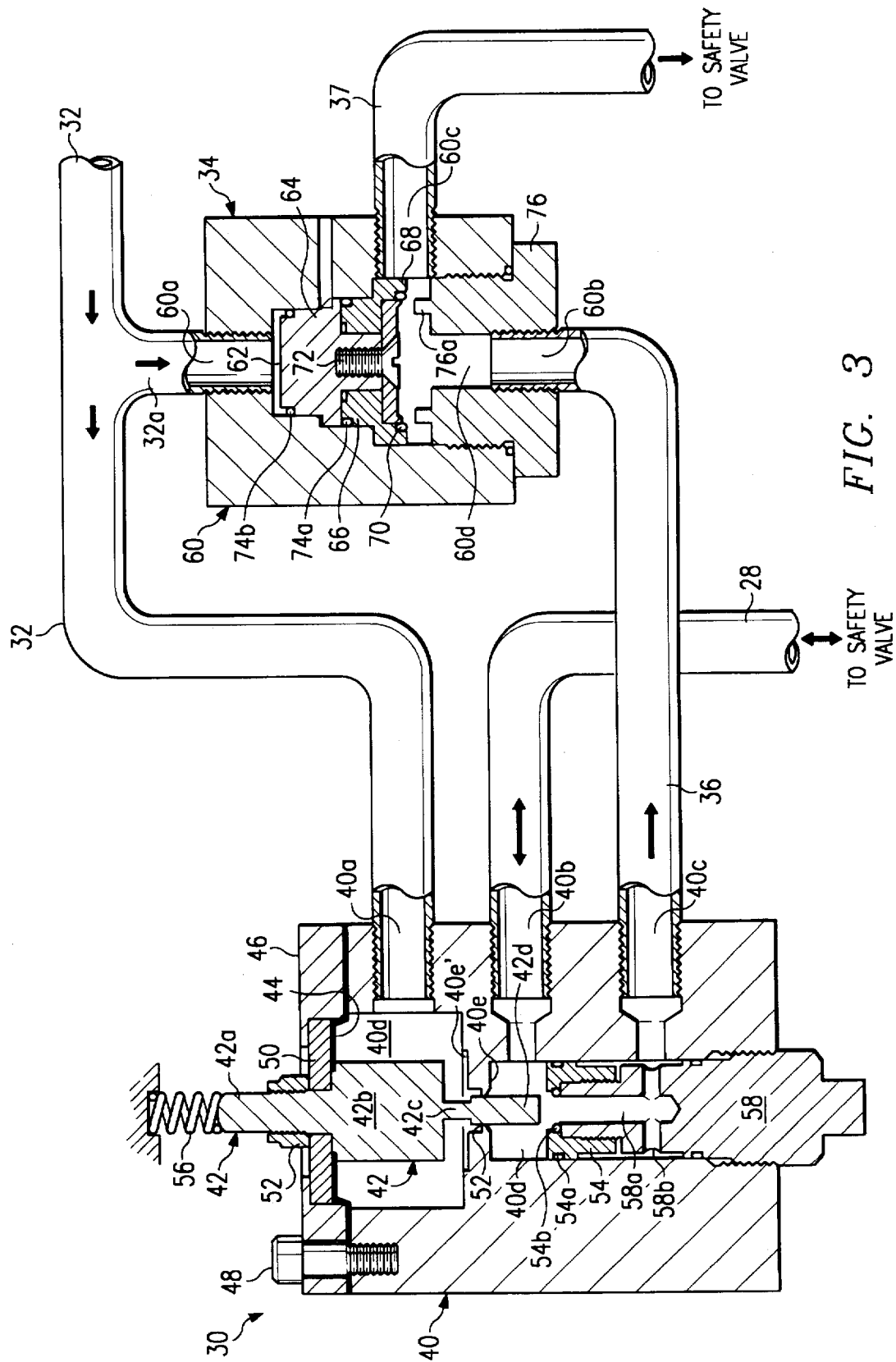
FIG. 3 is a view, similar to FIG. 2 but depicting the pilot valve and the regulator in their open positions.

However, when the system fluid pressure exceeds the predetermined limit, the corresponding force acting on the lower surface of the diaphragm 44 by the system fluid in the passage 40a of the pilot valve 30 forces the piston 42 upwardly to the position shown in FIG. 3. In this position, the upper portion of the stem 42d of the piston 42 engages the seal 52 and thus blocks communication between the passages 40a and 40b; while the lower end of the stem 42d is above the seal ring 54b to permit flow of the control fluid from the chamber 24 of the safety relief valve 10, through the conduit 28, and to the pilot valve 30. The control fluid thus passes through the bore 40d of the pilot valve 30 and, via the conduit 36, to the inlet passage 60b of the regulator 34.

Immediately after the opening of the piston 42 of the pilot valve 30 in the above manner the pressure of the control fluid passing from the chamber 24, through the pilot valve and to the regulator 34 is substantially the same as the system pressure. Therefore, the pressure of the control fluid in the passage 60b acting against the lower end of the valve assembly 62 of the regulator 34 forces the valve assembly upwardly to its open position against the force applied to the upper end of the latter assembly by the system fluid pressure. The control fluid thus passes from the passage 60b, through the lower portion of the open bore 60d, and to the outlet passage 60c for passage, via the conduit 37, to the outlet passage 12b of the safety relief valve 10 for disposal. After a portion of the control fluid evacuates the chamber 24 of the safety relief valve 10 and passes through the pilot valve 30 and the regulator 34 as described above, the pressure of the control fluid lowers to the extent that the resulting upwardly-directed force acting on the lower end of the valve assembly 62 becomes approximately equal to, or just less than, the force caused by the system pressure acting on the upper end of the valve assembly. When this occurs the valve assembly 62 moves back to its closed position of FIG. 2.

The design is such that the valve assembly 62 will move back to its closed position when a predetermined percentage of the control fluid evacuates the chamber 24 in the foregoing manner. This is achieved by fabricating the valve assembly 62 in a manner so that the surface area of its upper end is a predetermined percentage of the surface area of its lower end, which percentage corresponds to the percentage of the control fluid that evacuates the chamber 24. More particularly, and by way of example only, the design of the valve assembly 62 is such that the surface area of the upper end of the valve assembly 62 is approximately 73% of the surface area of its lower end. Therefore, after opening in the above-described manner, the valve assembly 62 will close back when the pressure of the control fluid in the chamber 24 reaches approximately 73% of the pressure of the system fluid, which results in minimal blowdown.

In the meantime, the piston 16 of the safety relief valve 10 responds to the increased system fluid pressure and to the control fluid pressure reduction in the chamber 24 by moving to its open position to relieve the fluid pressure in its inlet passage 12a to its outlet passage 12b. Since the fluid pressure reduction in the chamber 24 is approximately 27%, the design of the safety relief valve 10 can be such that the piston 16 will open when the fluid pressure reduction is slightly less than this value, for example, approximately 24%. According to a main feature of the present invention, the remaining fluid pressure in the chamber, in effect, resists the upward, opening movement of the piston 24 and thus insures that the opening movement of the piston is modulated and that it will thus open gradually. During this time, the piston 42 of the pilot valve 30 remains in its upper, closed position thus isolating the system pressure in the conduit 32 from the control fluid in the conduit 28 and therefore the chamber 24 of the safety relief valve 10.

When the system fluid pressure is reduced to a predetermined value as result of the opening of the safety relief valve 10 in the foregoing manner, the pistons 16 and 42 move to their closed positions shown in FIG. 1 and 2, respectively. As a result, flow of the control fluid from the chamber 24 of the safety relief valve, through the pilot valve 30 and to the regulator in the above-described manner is terminated, and the pressure of the control fluid equalizes with the system fluid pressure through the passages 40a, the pilot valve 30 and the passage 40b as described above.

As a result of all of the foregoing, the opening of the piston 16 of the safety relief valve is modulated and thus prevented from opening too quickly. Thus, the almost instantaneous opening of the piston of the prior art safety relief valves, as described above, is eliminated. As a result, the amount of fluid discharged from the safety relief valve 10 of the present invention is reduced and the wear and stress on the valve components and the associated flow conduits is minimized. Also, the pistons 16 and 42 of the safety relief valve 10 and the pilot valve 30, respectively, as well as the valve assembly 62 of the regulator do not "chatter". Further, the assembly of the present invention is relatively inexpensive and simple in construction and operation.

It is understood that several variations may be made in the foregoing without departing from the scope of the invention. Examples of these variations are as follows:

1. The branch conduit 32a of the conduit 32 can be eliminated to eliminate the application of the system fluid pressure on the upper portion of the valve assembly 62 of the regulator 34, and a spring or the like can be used to apply the latter force.

2. The diaphragm 44 can be replaced by another type of fluid pressure responsive device such as a bellows, or the like.

3. One or more of the conduits 28, 32, 36, and 37 can be eliminated and the regulator 34 can be mounted directly on the pilot valve 30 and/or the pilot valve can be mounted on the safety relief valve.

Other modifications, changes and substitutions are also intended and, in some instances, some features of the invention will be employed without a corresponding use of other features. Accordingly, it is appropriate that the appended claims be construed broadly and in a manner consistent with the scope of the invention.

What is claimed is:

1. A pilot-controlled safety relief valve assembly comprising:

a housing;

a piston movable between an open and a closed position in a chamber defined in the housing in response to predetermined changes in the system fluid pressure to control the flow of the system fluid through the housing, the chamber containing a control fluid the pressure of which controls the movement of the piston; and a pilot valve comprising:

a body member having a first passage connected to the chamber of the safety relief valve for maintaining a pressure of the control fluid in the chamber;

a second passage communicating with the first passage; and a piston movable in the body member between closed and open positions to respectively maintain the control fluid pressure in the first passage and enable the control fluid to pass from the first passage to the second passage; and a regulator connected to the second passage of the pilot valve for receiving the control fluid from the pilot valve and venting a portion of the control fluid, said regulator preventing the remaining control fluid from venting so as to maintain a fluid pressure in the chamber of the safety relief valve to modulate the movement of the piston of the safety relief valve from its closed to its open position, said regulator reducing the control fluid pressure in the chamber of the safety relief valve to a predetermined percentage of the pressure of the system fluid.

2. The assembly of claim 1 wherein the regulator comprises a housing having an inlet for receiving the control fluid and an outlet for venting the portion of the control fluid, and a piston movable in the housing and normally biased to a closed position preventing the flow of the control fluid from the latter inlet to the latter outlet, the piston being exposed to the control fluid in the regulator housing and being adapted to move in the regulator housing to vent the portion of the control fluid from the latter inlet to the latter outlet and close in response to a reduction in the pressure of the control fluid as a result of the venting.

3. A pilot-controlled safety relief valve assembly comprising:

a housing;

a piston movable between an open and a closed position in a chamber defined in the housing in response to predetermined changes in the system fluid pressure to control the flow of the system fluid through the housing, the chamber containing a control fluid the pressure of which controls the movement of the piston; and a pilot valve comprising:

a body member having a first passage connected to the chamber of the safety relief valve for maintaining the pressure of the control fluid in the chamber and a second passage communicating with the first passage; and a piston movable in the body member between closed and open positions to respectively maintain the control fluid pressure in the first passage and enable the control fluid to pass from the first passage to the second passage; and a regulator connected to the second passage of the pilot valve and comprising:

a housing having an inlet for receiving the control fluid and an outlet for venting the portion of the control fluid; and a piston movable in the housing and normally biased to a closed position preventing the flow of the control fluid from the latter inlet to the latter outlet, the latter piston being exposed to the control fluid in the regulator housing and being adapted to move in the regulator housing to vent the portion of the control fluid from the latter inlet to the latter outlet and close in response to a reduction in the pressure of the control fluid as a result of the venting, the latter piston also being exposed to the system fluid which biases the latter piston to the closed position, said regulator preventing the remaining control fluid from venting so as to maintain a fluid pressure in the chamber of the safety relief valve to modulate the movement of the piston of the safety relief valve from its closed to its open position.

4. The assembly of claim 3 wherein the pilot valve has a third passage connected to the system fluid and wherein the piston of the pilot valve moves between its closed and open positions in response to variations in the pressure of the system fluid.

5. The assembly of claim 4 wherein the piston of the pilot valve is normally in the closed position and opens in response to the pressure of the system fluid exceeding a predetermined value.

6. In an assembly for relieving the pressure of fluid in a system when the pressure exceeds a predetermined value and including a safety relief valve having a piston movable between an opened and a closed position in a chamber defined in a housing in response to predetermined changes in the system fluid pressure to control the flow of the system fluid through the housing, the chamber containing a control fluid the pressure of which controls the piston movement, wherein the improvement comprises:

a pilot valve comprising:

a body member having a first passage connected to the chamber of the safety relief valve for maintaining a pressure of the control fluid in the chamber;

a second passage communicating with the first passage; and a piston movable in the body member between closed and open positions to respectively maintain the control fluid pressure in the first passage and enable the control fluid to pass from the first passage to the second passage; and a regulator connected to the second passage of the pilot valve for receiving the control fluid from the pilot valve and venting a portion of the control fluid, the regulator preventing the remaining control fluid from venting so as to maintain a fluid pressure in the chamber of the safety relief valve to modulate the movement of the piston of the safety relief valve from its closed to its open position, the regulator reducing the control fluid pressure in the chamber of the safety relief valve to a predetermined percentage of the pressure of the system fluid.

7. The improvement of claim 6 wherein the regulator comprises a housing having an inlet for receiving the control fluid and an outlet for venting the portion of the control fluid, and a piston movable in the housing and normally biased to a closed position preventing the flow of the control fluid from the latter inlet to the latter outlet, the latter piston being exposed to the control fluid in the regulator housing and being adapted to move in the regulator housing to vent the portion of the control fluid from the latter inlet to the latter outlet and close in response to a reduction in the pressure of the control fluid as a result of the venting.

8. In an assembly for relieving the pressure of fluid in a system when the pressure exceeds a predetermined value and including a safety relief valve having a piston movable between an open and a closed position in a chamber defined in a housing in response to predetermined changes in the system fluid pressure to control the flow of the system fluid through the housing, the chamber containing a control fluid the pressure of which controls the piston movement, wherein the improvement comprises:

a pilot valve comprising:

a body member having a first passage connected to the chamber of the safety relief valve for maintaining a pressure of the control fluid in the chamber;

a second passage communicating with the first passage; and a piston movable in the body member between closed and open positions to respectively maintain the control fluid pressure in the first passage and enable the control fluid to pass from the first passage to the second passage; and a regulator connected to the second passage of the pilot valve and comprising:

a housing having an inlet for receiving the control fluid and an outlet for venting the portion of the control fluid; and a piston movable in the housing and normally biased to a closed position preventing the flow of the control fluid from the latter inlet to the latter outlet, the latter piston being exposed to the control fluid in the regulator housing and being adapted to move in the regulator housing to vent the portion of the control fluid from the latter inlet to the latter outlet and close in response to a reduction in the pressure of the control fluid as a result of the venting, the latter piston also being exposed to the system fluid which biases the latter piston to the closed position, the regulator preventing the remaining control fluid from venting so as to maintain a fluid pressure in the chamber of the safety relief valve to modulate the movement of the piston of the safety relief valve from its closed to its open position.

9. The improvement of claim 8 wherein the pilot valve has a third passage connected to the system fluid and wherein the piston of the pilot valve moves between its closed and open positions in response to variations in the pressure of the system fluid.

10. The improvement of claim 9 wherein the piston of the pilot valve is normally in the closed position and opens in response to the pressure of the system fluid exceeding a predetermined value.

11. Apparatus for controlling the opening of a safety relief valve having a chamber containing a control fluid that controls the operation of the valve, the apparatus comprising:

a pilot valve comprising:

a body member having a first passage connected to the chamber of the safety relief valve for maintaining a pressure of the control fluid in the chamber, and a second passage communicating with the first passage;

a piston movable in the body member between closed and open positions to respectively maintain the control fluid pressure in the first passage and enable the control fluid to pass from the first passage to the second passage; and a regulator connected to the second passage of the pilot valve for receiving the control fluid from the pilot valve and venting a portion of the control fluid, the regulator preventing the remaining control fluid from venting so as to maintain a fluid pressure in the chamber of the safety relief valve to modulate the movement of the piston of the safety relief valve from its closed to its open position, the regulator reducing the control fluid pressure in the chamber of the safety relief valve to a predetermined percentage of the pressure of the system fluid.

12. Apparatus for controlling the opening of a safety relief valve having a chamber containing an control fluid that controls the operation of the valve, the apparatus comprising:

a pilot valve comprising:

a body member having a first passage connected to the chamber of the safety relief valve for maintaining a pressure of the control fluid in the chamber;

a second passage communicating with the first passage, and a piston movable in the body member between closed and open positions to respectively maintain the control fluid pressure in the first passage and enable the control fluid to pass from the first passage to the second passage; and a regulator connected to the second passage of the pilot valve and comprising:

a housing having an inlet for receiving the control fluid and an outlet for venting the portion of the control fluid; and a piston movable in the housing and normally biased to a closed position preventing the flow of the control fluid from the latter inlet to the latter outlet, the latter piston being exposed to the control fluid in the regulator housing and being adapted to move in the regulator housing to vent the portion of the control fluid from the latter inlet to the latter outlet and close in response to a reduction in the pressure of the control fluid as a result of the venting; the latter piston also being exposed to the system fluid which biases the latter piston to the closed position, the regulator preventing the remaining control fluid from venting so as to maintain a fluid pressure in the chamber of the safety relief valve to modulate the movement of the piston of the safety relief valve from its closed to its open position.

13. The apparatus of claim 12 wherein the pilot valve has a third passage connected to the system fluid and wherein the piston of the pilot valve moves between its closed and open positions in response to variations in the pressure of the system fluid.

14. The apparatus of claim 13 wherein the piston of the pilot valve is normally in the closed position and opens in response to the pressure of the system fluid exceeding a predetermined value.

15. An assembly for controlling the opening of a safety relief valve exposed to a system fluid pressure and containing a control fluid which controls the opening of the safety relief valve, the assembly comprising a pilot valve connected to the safety relief valve and adapted to respond to a predetermined pressure of the system fluid for permitting flow of the control fluid, a regulator for receiving the control fluid and for reducing the pressure of the control fluid to a predetermined percentage of the pressure of the system fluid, the safety relief valve opening in response to the reduction of the control fluid pressure, the remaining control fluid pressure modulating the opening of the safety relief valve.

16. The assembly of claim 15 wherein the control fluid flows from the safety relief valve, through the pilot valve and to the regulator.

17. The assembly of claim 15 wherein the pilot valve comprises a body member having a first passage connected to the chamber of the safety relief valve for maintaining a pressure of the control fluid in the chamber, a second passage communicating with the first passage, and a piston movable in the body member between closed and open positions to respectively maintain the control fluid pressure in the first passage and enable the control fluid to pass from the first passage to the second passage.

18. The assembly of claim 17 wherein the pilot valve has a third passage connected to the system fluid and wherein the piston of the pilot valve moves between its closed and open positions in response to variations in the pressure of the system fluid.

19. The assembly of claim 14 wherein the piston of the pilot valve is normally in the closed position and opens in response to the pressure of the system fluid exceeding a predetermined value.

20. An assembly for controlling the opening of a safety relief valve exposed to a system fluid pressure and containing a control fluid which controls the opening of the safety relief valve, the assembly comprising a pilot valve connected to the safety relief valve and adapted to respond to a predetermined pressure of the system fluid for permitting flow of the control fluid, a regulator for receiving the control fluid and for reducing the pressure of the control fluid a predetermined amount, the regulator comprising a housing having an inlet for receiving the control fluid and an outlet for venting the portion of the control fluid, and a piston movable in the housing and normally biased to a closed position by the system fluid for preventing the flow of the control fluid from the latter inlet to the latter outlet, the piston being exposed to the control fluid in the regulator housing and being adapted to move in the regulator housing to vent the portion of the control fluid from the latter inlet to the latter outlet and close in response to a reduction in the pressure of the control fluid as a result of the venting, the safety relief valve opening in response to the reduction of the control fluid pressure, the remaining control fluid pressure modulating the opening of the safety relief valve.

21. A method for controlling the opening of a safety relief valve exposed to a system fluid pressure and containing a control fluid which controls the opening of the safety relief valve, the method comprising the steps of maintaining the control fluid pressure at a value sufficient to maintain the safety relief valve in its open position, responding to a predetermined pressure of the system fluid for permitting flow of the control fluid from the safety relief valve to reduce the pressure of the control fluid a predetermined percentage of the pressure of the system fluid to allow the safety relief valve to open, and terminating the flow of the control fluid after the pressure reduction of the control fluid to maintain a control fluid pressure in the safety relief valve that modulates the opening of the safety relief valve.

22. The method of claim 21 further comprising the step of venting that portion of the control fluid that flows from the safety relief valve.

* * * * *

UNITED STATES PATENT AND TRADEMARK OFFICE
CERTIFICATE OF CORRECTION

PATENT NO. : 5,725,015
DATED : March 10, 1998
INVENTOR(S) : Theodos et al.

It is certified that error appears in the above-identified patent and that said Letters Patent is hereby corrected as shown below:

Column 2, line 49, "fight" should be --right--.

Signed and Sealed this

First Day of June, 1999

Attest:

Q. TODD DICKINSON

Attesting Officer

Acting Commissioner of Patents and Trademarks